US012625869B2

(12) United States Patent
Shah et al.

(10) Patent No.: US 12,625,869 B2
(45) Date of Patent: May 12, 2026

(54) GENERATIVE AI-DRIVEN MULTI-SOURCE DATA QUERY SYSTEM

(71) Applicant: Microsoft Technology Licensing, LLC, Redmond, WA (US)

(72) Inventors: Sagar Ketan Shah, Fremont, CA (US); Amir Jalali, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 13 days.

(21) Appl. No.: 18/505,873

(22) Filed: Nov. 9, 2023

(65) Prior Publication Data

US 2025/0156419 A1 May 15, 2025

(51) Int. Cl.
*G06F 15/16* (2006.01)
*G06F 16/2452* (2019.01)
*G06F 16/2455* (2019.01)
*G06F 16/248* (2019.01)
*G06F 16/25* (2019.01)

(52) U.S. Cl.
CPC ...... *G06F 16/2455* (2019.01); *G06F 16/2452* (2019.01); *G06F 16/248* (2019.01); *G06F 16/254* (2019.01)

(58) Field of Classification Search
None
See application file for complete search history.

(56) References Cited

U.S. PATENT DOCUMENTS 11,500,871 B1 * 11/2022 Kulkarni ............... G06N 20/00
2022/0382852 A1 * 12/2022 Yang ..................... G06F 16/951

2023/0316064 A1 * 10/2023 Margolin ................. G06N 3/08
706/22
2024/0202539 A1 * 6/2024 Poirier .................. G06F 16/345
2024/0265281 A1 * 8/2024 Hart ........................ G06F 40/58
2024/0346018 A1 * 10/2024 Rao ........................ G06F 16/219
2024/0370479 A1 * 11/2024 Hudetz ................. G06F 16/316
2024/0411757 A1 * 12/2024 Duggirala ......... G06F 16/24542
2025/0077602 A1 * 3/2025 Khan .................. G06F 16/9535

FOREIGN PATENT DOCUMENTS

CN     116955416 A     10/2023
WO     2023284933 A1     1/2023

OTHER PUBLICATIONS

International Search Report and Written Opinion received for PCT Application No. PCT/US2024/050863, Feb. 3, 2025, 18 Pages.

* cited by examiner

*Primary Examiner* — Alex Gofman
(74) *Attorney, Agent, or Firm* — Nicholson De Vos Webster & Elliott LLP

(57) ABSTRACT

Embodiments of the disclosed technologies include, in response to receiving a query, matching the query to metadata from a plurality of heterogeneous data sources, and selecting one or more data sources from the plurality of heterogeneous data sources for answering the query, by sending the query and embeddings of the matched metadata to a generative artificial intelligence (GAI), and prompting the GAI to select matching data sources. Based on the data from the GAI, generating one or more custom queries targeted to the matching data sources selected by the GAI, the custom queries formatted to be sent to the selected data sources, executing the one or more custom queries across the selected data sources, and summarizing results from the executing and providing a response to the query.

19 Claims, 9 Drawing Sheets

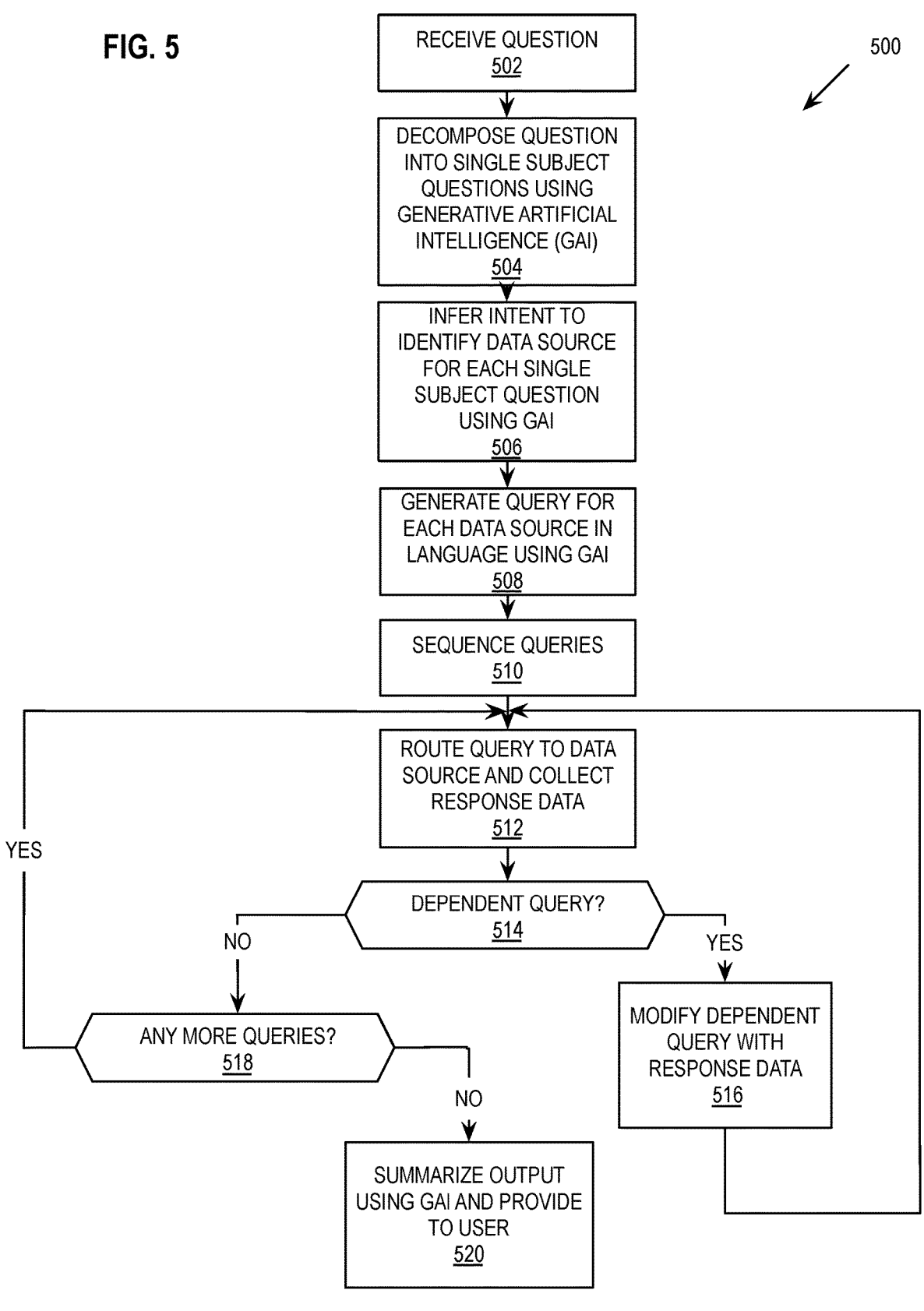

500

RECEIVE QUESTION
502

DECOMPOSE QUESTION INTO SINGLE SUBJECT QUESTIONS USING GENERATIVE ARTIFICIAL INTELLIGENCE (GAI)
504

INFER INTENT TO IDENTIFY DATA SOURCE FOR EACH SINGLE SUBJECT QUESTION USING GAI
506

GENERATE QUERY FOR EACH DATA SOURCE IN LANGUAGE USING GAI
508

SEQUENCE QUERIES
510

ROUTE QUERY TO DATA SOURCE AND COLLECT RESPONSE DATA
512

DEPENDENT QUERY?
514

NO

YES

ANY MORE QUERIES?
518

MODIFY DEPENDENT QUERY WITH RESPONSE DATA
516

YES

NO

SUMMARIZE OUTPUT USING GAI AND PROVIDE TO USER
520

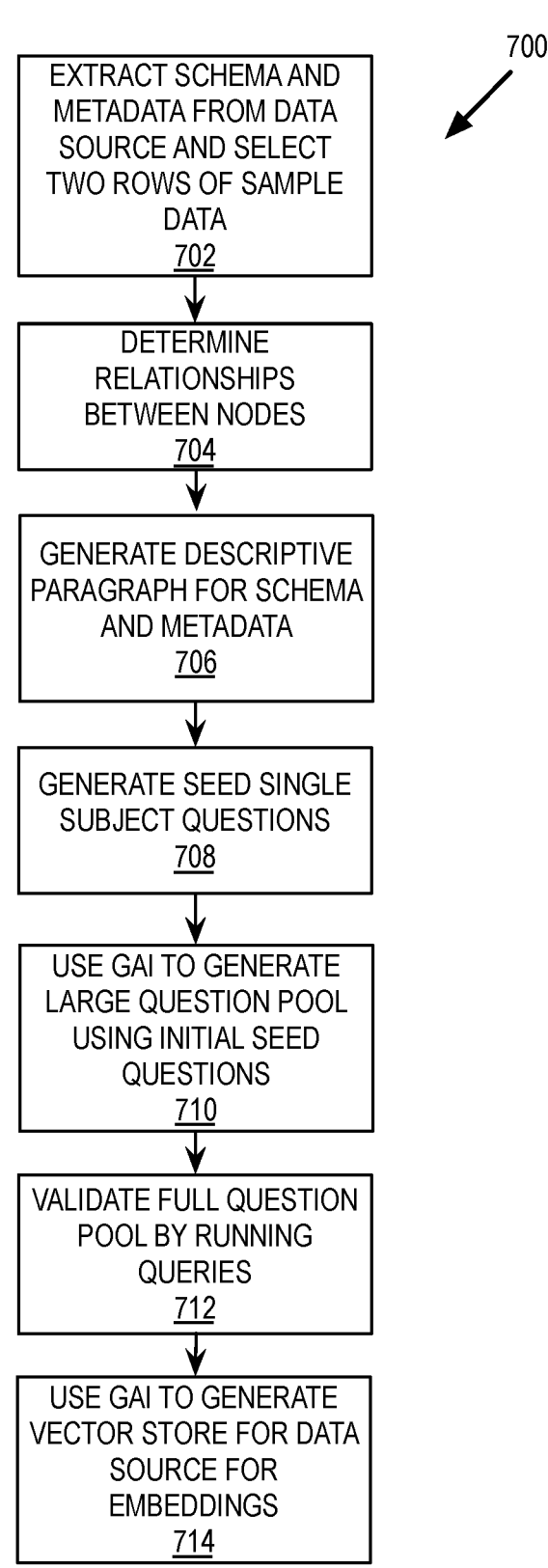

700

EXTRACT SCHEMA AND
METADATA FROM DATA
SOURCE AND SELECT
TWO ROWS OF SAMPLE
DATA
702

DETERMINE
RELATIONSHIPS
BETWEEN NODES
704

GENERATE DESCRIPTIVE
PARAGRAPH FOR SCHEMA
AND METADATA
706

GENERATE SEED SINGLE
SUBJECT QUESTIONS
708

USE GAI TO GENERATE
LARGE QUESTION POOL
USING INITIAL SEED
QUESTIONS
710

VALIDATE FULL QUESTION
POOL BY RUNNING
QUERIES
712

USE GAI TO GENERATE
VECTOR STORE FOR DATA
SOURCE FOR
EMBEDDINGS
714

FIG. 8

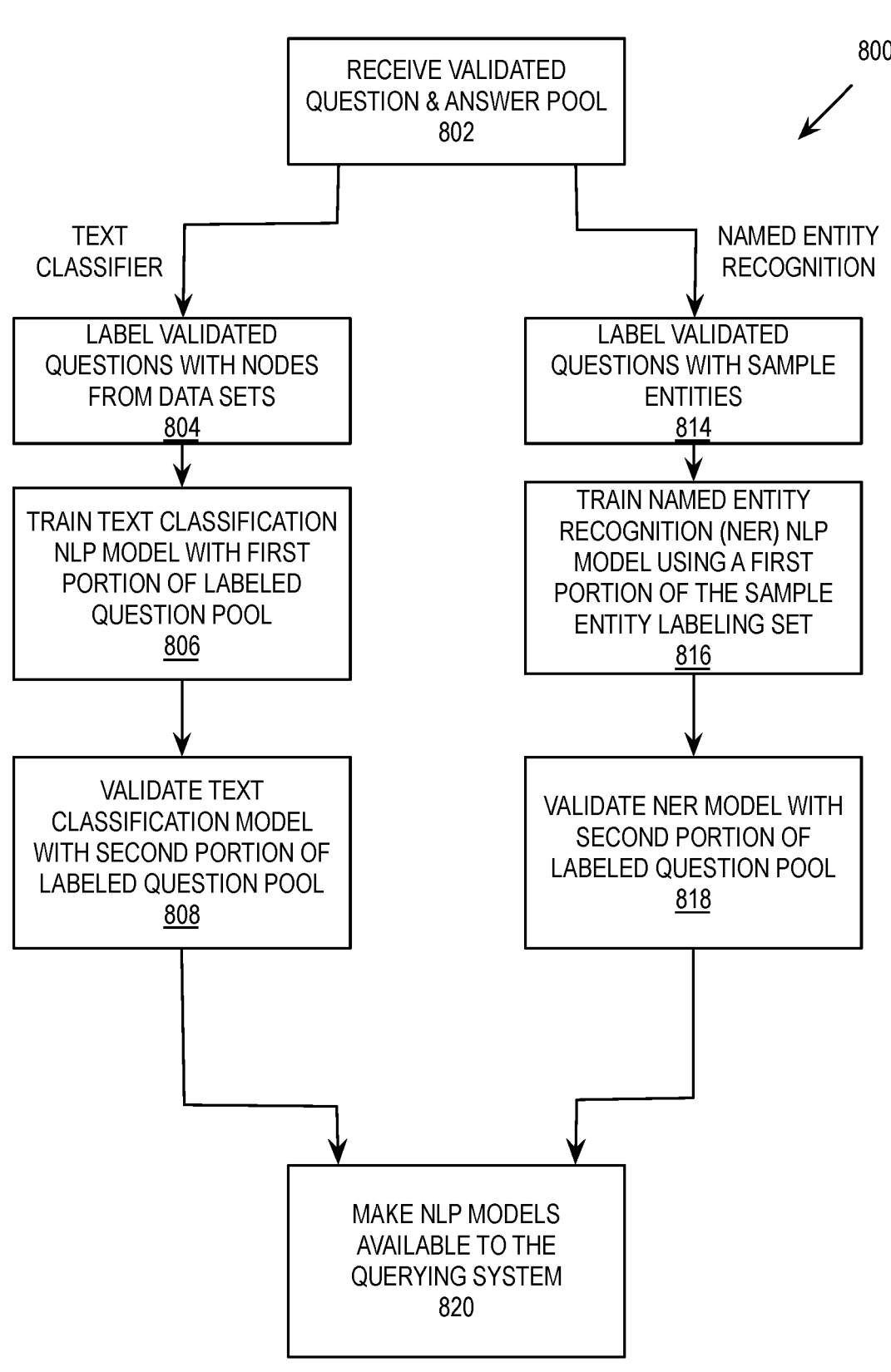

800

RECEIVE VALIDATED
QUESTION & ANSWER POOL
802

TEXT
CLASSIFIER

NAMED ENTITY
RECOGNITION

LABEL VALIDATED
QUESTIONS WITH NODES
FROM DATA SETS
804

LABEL VALIDATED
QUESTIONS WITH SAMPLE
ENTITIES
814

TRAIN TEXT CLASSIFICATION
NLP MODEL WITH FIRST
PORTION OF LABELED
QUESTION POOL
806

TRAIN NAMED ENTITY
RECOGNITION (NER) NLP
MODEL USING A FIRST
PORTION OF THE SAMPLE
ENTITY LABELING SET
816

VALIDATE TEXT
CLASSIFICATION MODEL
WITH SECOND PORTION OF
LABELED QUESTION POOL
808

VALIDATE NER MODEL WITH
SECOND PORTION OF
LABELED QUESTION POOL
818

MAKE NLP MODELS
AVAILABLE TO THE
QUERYING SYSTEM
820

GENERATIVE AI-DRIVEN MULTI-SOURCE DATA QUERY SYSTEM

TECHNICAL FIELD

Embodiments of the invention relate to the field of data access; and more specifically, to search across multiple heterogenous data sources.

BACKGROUND ART

Obtaining data from a data source generally requires formulating a query in the appropriate format and language for the particular data source. If the data may be in one of a set of data sources, each data source must be individually queried, complying with the format and language requirements for each data source.

BRIEF DESCRIPTION OF THE DRAWINGS

The invention may best be understood by referring to the following description and accompanying drawings that are used to illustrate embodiments of the invention. In the drawings:

FIG. 5 is a detailed flow diagram of an example method to generate responses across a plurality of data sources, in accordance with some embodiments of the present disclosure.

FIG. 7 is a flow diagram of pre-processing a data source, in accordance with some embodiments of the present disclosure.

FIG. 8 is a flow diagram of training the NPL systems, in accordance with some embodiments of the present disclosure.

DETAILED DESCRIPTION

Figure 1:
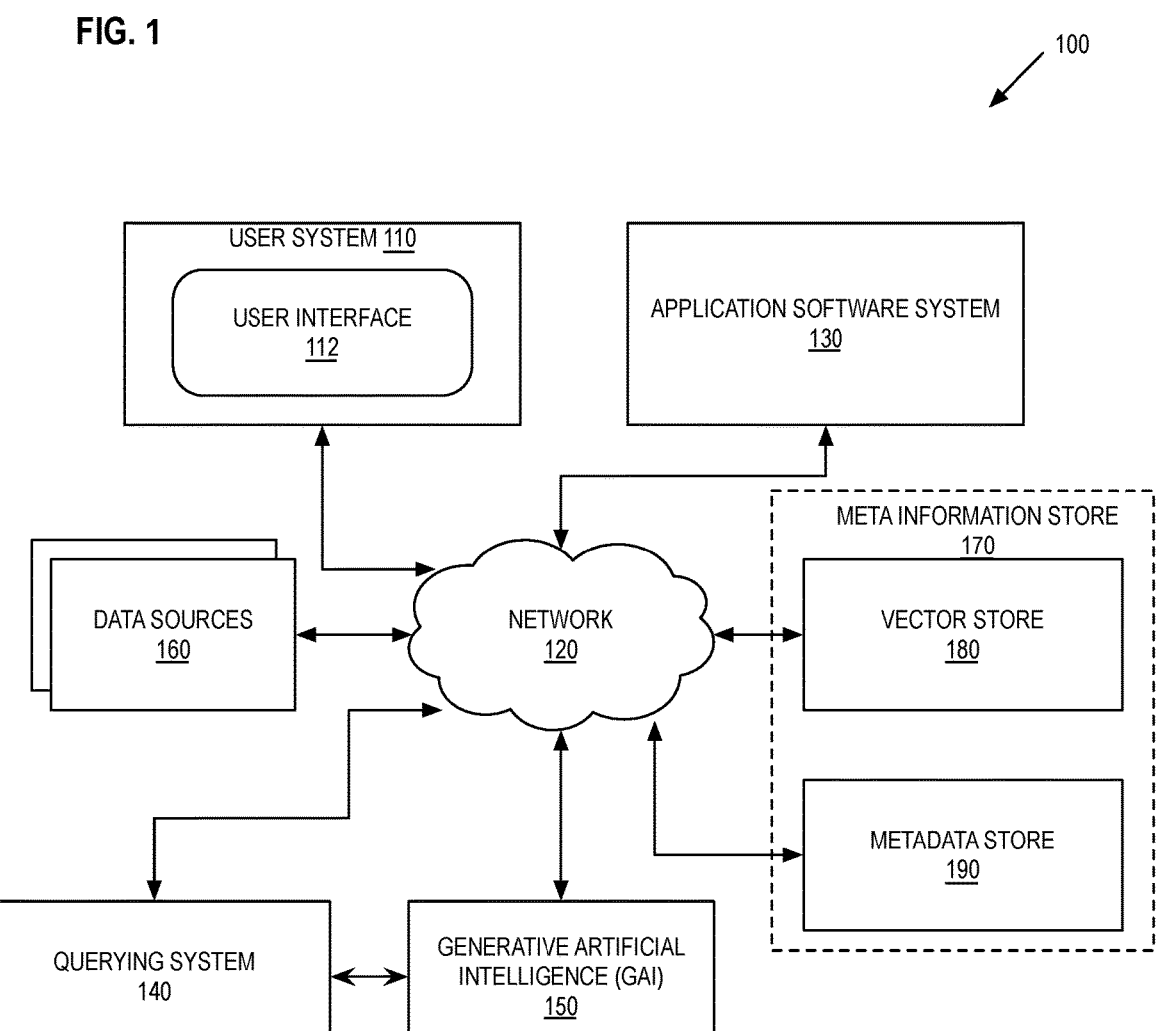
FIG. 1 illustrates an example computing system that includes a querying system, according to some embodiments of the invention.

A method and apparatus are described in which a generative artificial intelligence (GAI) is used to generate questions and identify a target data source to respond to the questions. The process receives a query, which may be a natural language query, and analyzes the query to identify one or more single subject questions using a GAI. The process then identifies one or more data sources from a plurality of heterogeneous data sources for answering the one or more questions, using the GAI. The process generates one or more custom queries targeted and formatted to the one or more data sources and executes the one or more custom queries across the one or more data sources. The process then summarizes the response, using the GAI, and provides the response.

Aspects of the present disclosure are directed to providing an integrated front end to get responses to a query across multiple data sources. The process allows a user to enter a natural language query, and processes the query into one or more simple questions, using a generative AI large language model (GAI). The process then uses the GAI to identify one or more of a plurality of heterogenous data sources that could be used to answer each of the one or more simple questions. The process generates custom queries for each of the data sources, using the GAI. The custom queries are in the language and format of the data source.

Conventional systems require users to know the content of all of the available data sources, their schema and language, and the query methods for each of those data sources. They then required the user to select the appropriate data source, query the data source, and gather information from it, to answer a question.

Furthermore, conventional systems that use artificial intelligence systems to answer queries require training a model with large amounts of data, often terabytes of data. That technique isn't scalable when there are a significant number of disparate data sources that would be used to obtain a response to the query. The present system overcomes the issues with training a GAI to obtain data from a large number of data sources that have a large amount of rapidly changing data, by utilizing the GAI to construct the query and select the data source to answer the query, rather than having the GAI respond directly to the query. This enables the system to be updated when additional data sources become available, without extensive retraining of the GAI. Additionally, some data sources cannot be used for training due to privacy reasons, e.g., data sets which include personal information, or other restrictions, e.g., security or privilege restrictions. By utilizing the present approach, the system does not need to use such data to train the GAI. Furthermore, this avoids the need for the GAI to access personal data from the data sources during query construction or data source selection. The present system also enables the GAI to direct a query to a data set to which the GAI does not have access privileges. Thus, the present system also addresses protecting user and data privacy for content in data sets while utilizing a GAI to enable retrieving data from all data sets, including those that include personally identifiable information (PII) or that are privileged and cannot be made accessible to a GAI.

Aspects of the present disclosure address the above and other deficiencies of conventional approaches by providing a single front end querying system enabling the use of a single, natural language, query across the set of heterogenous data sources to receive an answer. The disclosed technologies can make data access, queries, and decision-making more efficient and effective. The system can be used to receive queries in various formats, and retrieve responses in various formats, including text, image, audio, video, or other formats.

The disclosed technologies use a generative artificial intelligence and/or large language model (GAI or LLM) to parse a natural language query, or a query in another format, into simple sub-questions, which can be used to query a data source. The GAI is also used to select the data sources that the sub-question should be directed to and translates the question into the appropriate language and format for the data source. By using the GAI for query generation and data source selection, the system provides the advantages of a GAI, without requiring the training of the GAI with data from each data source, or the sharing of the contents of each data source with the GAI. This is particularly useful when one or more of the data sources have personally identifiable information (PII), or are access restricted due to privilege, security, or other reasons, and thus using that data to train the GAI is contraindicated.

A generative artificial intelligence (GAI) model or generative model uses artificial intelligence technology, e.g., neural networks, to machine-generate new digital content based on model inputs and the previously existing data with which the model has been trained. Whereas discriminative models are based on conditional probabilities $P(y|x)$, that is, the probability of an output y given an input x (e.g., is this a photo of a dog?), generative models capture joint probabilities $P(x, y)$, that is, the likelihood of x and y occurring together (e.g., given this photo of a dog and an unknown person, what is the likelihood that the person is the dog's owner, Sam?).

A generative language model is a particular type of GAI model that generates new text in response to model input. The model input includes a task description, also referred to as a prompt. The task description can include instructions and/or examples of digital content. A task description can be in the form of natural language text, such as a question or a statement and/or metadata, and can also include non-text forms of content, such as digital imagery and/or digital audio.

Given a task description, a generative model can generate a set of task description-output pairs, where each pair contains a different output. In some implementations, the generative model assigns a score to each of the generated task description-output pairs. The output in a given task description-output pair contains text that is generated by the model itself rather than provided to the model as an input. The score associated by the model with a given task description-output pair represents a probabilistic or statistical likelihood of there being a relationship between the output and the corresponding task description in the task description-output pair. The score for a given task description-output pair is dependent upon the way the generative model has been trained and the data used to perform the model training. The generative model can sort the task description-output pairs by score and output only the pair or pairs with the top scores. For example, the generative model could discard the lower-scoring pairs and only output the top-scoring pair as its final output.

A large language model (LLM) is a type of GAI, and more specifically a generative language model, that is trained in an unsupervised way on massive amounts of unlabeled data, such as publicly available texts extracted from the Internet, using deep learning techniques. A large language model can be configured to perform one or more natural language processing tasks, such as generating text, classifying text, answering questions in a conversational manner, and translating text from one language to another.

Large language models have the technical problem of hallucination. In artificial intelligence, a hallucination is often defined as generated content that is nonsensical or unfaithful to the provided source content. In long exchanges or multi-step processes, the risk of AI hallucination is increased with each round of thread provided to the GAI.

As a result of these and other issues, a technical challenge is to incorporate the use of LLMs and/or other GAI models into the operational flows of application software systems while mitigating the risk of AI hallucination.

Yet another technical challenge is how to train the GAI with large amounts of data, from a heterogenous set of data sources, which may include petabytes of data. When there are numerous data sources that may be needed to answer a query, traditional training techniques do not work. Another challenge is the requirement to configure the GAI for each type of data source from which information is requested. Another technical challenge is ensuring that new data sources can be added to the GAI, as they become available.

To address these and other technical challenges, the disclosed technologies provide a querying system which utilizes the GAI to generate single topic questions for the data sources and identify the correct data sources for answering the query, rather than directly answering the query using the GAI itself. This enables the use of the GAI without requiring training with the contents of each of data source, or retraining as new data sources are added to the system. This is additionally useful because it avoids issues around privacy and data security for any data sources that may include personally identifiable information or may be access restricted for another reason.

As described in more detail below, embodiments of the disclosed querying system address the above and other challenges via a querying system which may include one or more of a query decompositor, an intent inference engine, and a multi-query generator.

Certain aspects of the disclosed technologies are described in the context of generative artificial intelligence models that output pieces of writing, i.e., natural language text. However, the disclosed technologies are not limited to generative models that produce text output. Both the question and the response from the data sources may be text, image, video, or another data format.

Certain aspects of the disclosed technologies are described in the context of electronic dialogs conducted via a network with at least one application software system, such as an information technology interface. However, aspects of the disclosed technologies are not limited to information technology interfaces but can be used to improve the ability to obtain data from a heterogenous set of data sources by various types of software applications and one or more GAI-based systems. Any network-based application software system can act as an application software system or GAI-based system to which the disclosed technologies can be applied. For example, news, entertainment, and e-commerce apps installed on mobile devices, enterprise systems, messaging systems, notification systems, search engines, workflow management systems, collaboration tools, and social graph-based applications can all function as application software systems or GAI-based systems with which the disclosed technologies can be used.

The disclosure will be understood more fully from the detailed description given below, which references the accompanying drawings. The detailed description of the drawings is for explanation and understanding and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains but can be used with or incorporated into other embodiments, including embodiments shown in other drawings.

As used herein, query, dialog, chat, question, or conversation may refer to one or more conversational threads involving a user of a computing device and an application software system. For example, a query may be a natural language request for information from an information technology system. The example below walks through one embodiment of the process.

For example, a natural language query from a user or another system may be "what is the host name of Sagar's laptop?"

Using the disclosed technologies, at the first stage, the GAI would parse the question and break it down to a sequence of simple questions. The prompt for the GAI would include, in addition to the original question, example data representing validated simple questions for each of the data sources, and specific instructions on how to craft the queries. In one embodiment, the prompt to the GAI includes as metadata instructions not to use prior knowledge, and to select from the validated simple questions.

The simple questions the GAI returns may be:

What is the username of Sagar?

What are Sagar's devices?

Which of the devices is Sagar's laptop?

What is the host name of the device?

As can be seen, each of these questions depends on one or more prior questions. Thus, in one embodiment, the sequence of questions is chained, and prior outputs are used as partial inputs for the next sub-question/task.

The second stage is to identify the target data sources for each of the questions. In one embodiment, the target data sources are identified by the GAI using a prompt that includes the selected simple question returned by the GAI, and metadata associated with the data sources. In one embodiment, rather than using raw metadata, the system uses a formatted description of the data source's structure, as will be discussed below. The data associated with the data sources that is included with the prompt is retrieved from a vector store. For each simple question, the GAI provides a destination data source that the question should be directed to.

What is the username of Sagar? This question could be directed to the Active Directory database, to determine the username. It may return "sshah123."

What are [[Sagar's]] devices? This question would be changed to replace "Sagar" with the username or user ID identified in Question 1, and may be directed to Intune, or another corporate directory of devices.

Which of the [[devices]] is [[Sagar's]] laptop? This question would be changed to list the devices retrieved from the previous query and may be directed to a database.

What is the host name of the [[device]]? This question would be changed to replace device with the specific identifier of the laptop device identified in the prior question and may be directed to a host address directory.

Once the destination data source is identified for a question, the GAI translates the question into the appropriate format for the data source. For this, the prompt to the GAI includes the question, the selected data source, as well as meta information providing information about the data source, which indicates the language and format for the query to be generated. Once the query is generated by the GAI, it is directed by the system to the identified destination data source. The response from the data source to the first query may be used as a partial input to a subsequent query if a query is dependent on information from a prior response. The GAI is then used to summarize the final responses.

The system returns a specific response of the host name for Sagar's laptop. In prior systems, his would have taken four different queries, in different formats, from four different data sources, even if the user knew the appropriate data source for each query.

Using the described approaches, the system can return a response that requires information from multiple data sources, in multiple formats, without requiring the user to know the specific data sources or their query format, or structure. The data sources, in one embodiment, are preprocessed, and the prompts sent to the GAI are configured with meta information from the data sources, as will be described below. In some embodiments, the system automatically processes new data sources for addition to the available set of heterogenous data sources, when they become available. By utilizing the GAI for identifying the question and selecting the data source for querying, the present system enables the use of a GAI without extensive training on the corpus of data, without requiring retraining when new data sources are added, and without raising privacy issues by providing the content of data sources including private information to the GAI.

In this way, the present system can provide a unified view through a single interface into a complex set of heterogenous data sources, to provide accurate and fast answers. Rather than using embeddings to train the GAI to provide information, which is technically very difficult and expensive because these data sources include petabytes of data cumulatively, the system relies on extracted metadata from the data sources to populate a vector store that provides the embeddings that enable the GAI to identify the data source where the relevant information should be found. In one embodiment, as will be described in more detail below, the GAI prompts include synthetically generated questions and answers. t Providing context in the form of questions and answers reduces hallucination. Hallucination is when a GAI's attempt to synthesize data results in the invention of imaginary facts, which produces erroneous responses to prompts.

This system reduces the amount of network traffic, by ensuring that only the relevant data sources are queried, and queries are sequenced to eliminate duplication and unnecessary data pulls. In addition, because the questions are automatically generated and sequenced, it optimizes for latency. Furthermore, by using the querying system, the data accuracy is improved, because the correct data sources are queried. Additionally, the system enables a user who is not familiar with each of the data sources, their formats, and languages, to accurately obtain data, as well as reducing the learning curve and making data more accessible to users. This improvement in reduced network traffic and increased accuracy is a technical improvement in data retrieval and improves computer system functioning. Furthermore, by utilizing the GAI for query generation and data source selection, the training of the GAI is simplified because it does not require separate training for each data source, which is an additional technical improvement. Additionally, the present system can add a new data source without retraining the GAI.

FIG. 1 illustrates an example computing system that includes a querying system, according to some embodiments of the invention. In the embodiment of FIG. 1, computing system 100 includes a user system 110, a network 120, an application software system 130, a querying system 140, a generative artificial intelligence (GAI) which may be a large language model (LLM) 150, data sources 160, and meta information 170.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

User interface 112 can be used to input search queries and view or otherwise perceive output that includes data produced by application software system 130 or querying system 140. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Querying system 140 in one embodiment processes a question received from the user system 110 or application software system 130 and provides a response. The question and response may be text, image, video, or other content. Querying system 140 generates prompts for the GAI 150 to analyze the question, create simple questions, identify one or more data sources for each of the simple questions, translate each of the simple questions into the correct format for the identified data sources, and direct the formatted simple questions to the selected data source(s) 160, receives responses from the data sources, and summarizes the final response. The data sources 160 may be a set of heterogenous data sources which may include Microsoft™ Access databases, relational databases, static databases, multi-model databases, graph databases, other database formats, knowledge bases, knowledge graphs, documents in various formats, spreadsheets, etc. The data sources 160 may include data in a variety of formats. The querying system 140 generates prompts for the GAI using data and metadata from meta information 170, which includes vector store 180 and/or metadata store 190. The vector store 180 in one embodiment includes embeddings for the GAI system, including synthetic queries and responses for each of the data sources, as well as description representing the schema and content of each data source. Metadata store 190 in one embodiment includes raw text for the schema and questions and answers.

Querying system 140, data sources 160, vector store 180, metadata store 190, and GAI 150 can reside on at least one persistent and/or volatile storage device that can reside within the same local network as at least one other device of computing system 100 and/or in a network that is remote relative to at least one other device of computing system 100. Thus, although depicted as being included in computing system 100, the querying system 140, data sources 160, meta information 170, and GAI 150 can be part of computing system 100 or accessed by computing system 100 over a network, such as network 120.

The querying system 140 utilizes the GAI 150 for generating questions, determining which data sources to target questions to, formatting the questions for the selected data sources, and summarizing the responses. The prompt sent to the GAI 150 to generate the simple questions includes meta information from vector store 180 and/or metadata store 190. In one embodiment, meta information includes validated synthetic questions and responses. In one embodiment, the GAI prompt is to select one or more validated simple questions, rather than generate a new question. The prompt sent to the GAI 150 to select a destination data source for a simple question includes metadata of the data sources, representing their schema and content, from vector store 180 and/or metadata store 190. The prompt sent to the GAI to format the question includes metadata representing the schema and content of the selected data source from vector store 180 and/or metadata store 190.

In one embodiment, the GAI 150 is a generative artificial intelligence system that is natural language pretrained to match keywords and provide hints (as possible intention of the user and resolving jargon). In one embodiment, a text-based classification model like Bidirectional Encoder Representations from Transformers (BERT) with Named Entity Recognition (NER) may be used to provide the intent to drive accuracy. In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models. In some examples, the neural network-based machine learning model architecture includes or is based on one or more predictive text neural models that can receive text input and generate one or more outputs based on processing the text with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architectures include or are based on one or more multi-modal neural networks capable of outputting different modalities (e.g., text, image, sound, etc.) separately and/or in combination based on textual input. Accordingly, in some examples, a multimodal neural network implemented in the interface engine is capable of outputting digital content that includes a combination of two or more of text, images, video, or audio.

Application software system 130 is any type of application software system that includes or utilizes functionality provided by the querying system 140. Examples of application software system 130 include but are not limited to connections network software, such as social media platforms, and systems that are or are not be based on connections network software, such as information security (infosec) systems, search engines, job software, recruiter software, sales assistance software, advertising software, learning and education software, or any combination of any of the foregoing. The application software system 130 can include a system that utilizes data associated with network software such as social media platforms or systems.

While not specifically shown, it should be understood that any of user system 110, application software system 130, querying system 140, data sources 160, vector store 180, metadata store 190, and GAI 150, may include an interface embodied as computer programming code stored in computer memory that when executed causes a computing device to enable bidirectional communication with any other of user system 110, application software system 130, querying system 140, data sources 160, vector store 180, metadata store 190, and GAI 150, using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, querying system 140, data sources 160, vector store 180, metadata store 190, and GAI 150 is implemented using at least one computing device that is communicatively coupled to electronic communications network 120. Any of user system 110, application software system 130, querying system 140, data sources 160, vector store 180, metadata store 190, and GAI 150 can be bidirectionally communicatively coupled by network 120, in some embodiments. User system 110 as well as one or more different user systems (not shown) can be bidirectionally communicatively coupled to application software system 130 and personalized content provider system 140.

A typical user of user system 110 can be an administrator or end user of application software system 130, or querying system 140. User system 110 is configured to communicate bidirectionally with any of application software system 130, querying system 140, and data sources 160, in one embodiment. In another embodiment, the user system 110 communicates with application software system 130 and querying system 140, but does not directly communicate with data sources 160, GAI 150, or vector store 180 and/or metadata store 190.

The features and functionality of user system 110, application software system 130, querying system 140, data sources 160, vector store 180, metadata store 190, and GAI 150 are implemented using computer software, hardware, or software and hardware, and can include combinations of automated functionality, data structures, and digital data, which are represented schematically in the figures.

User system 110, application software system 130, querying system 140, data sources 160, vector store 180, metadata store 190, and GAI 150, are shown as separate elements in FIG. 1 for case of discussion but the illustration is not meant to imply that separation of these elements is required. Furthermore, some elements which are shown as single elements, such as GAI 150, may include multiple separate GAI systems. The illustrated systems, services, and data stores (or their functionality) can be divided over any number of physical systems, ranging from a single physical computer system to a cloud computing system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links, as well as wired networks, or computer busses when the system 100 is implemented on a single computer system. The various elements can be connected with different networks and/or types of networks.

The computing system 100 includes a querying system 140 which provides responses to user queries, based on information from data sources 160. The querying system 140 utilizes the GAI 150, in one embodiment, to derive questions, identify data sources 160 for targeting with the questions, sequence and update questions. The querying system 140 directs the queries to the appropriate data sources 160. The responses from the data sources are summarized and provided to the user in response to their original question. Further details with regards to the operations of the querying system 140 and the GAI 150 are described below.

The techniques described herein may be implemented with privacy safeguards to protect user privacy. Furthermore, the techniques described herein may be implemented with user privacy safeguards to prevent unauthorized access to personal data and/or confidential data. The training of the AI models described herein is executed to benefit all users fairly, without causing or amplifying unfair bias.

According to some embodiments, the techniques for the models described herein do not make inferences or predictions about individuals unless requested to do so through an input. As discussed above, the model described herein does not learn from and is not trained on user data. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may not be used for any training dataset that is used to train AI models. The techniques described herein may further utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Figure 2:
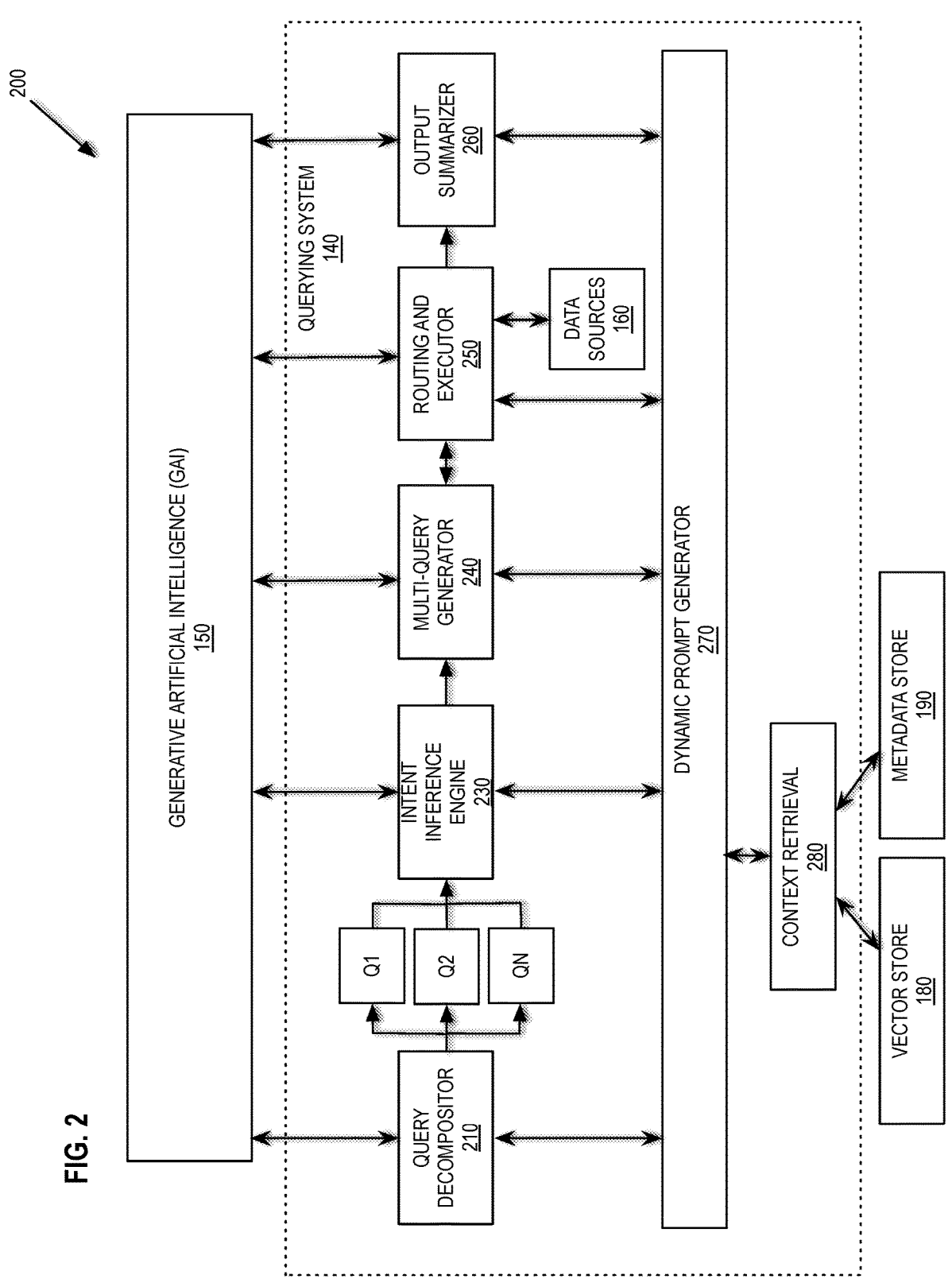
FIG. 2 illustrates the querying system in more detail, according to some embodiments of the invention.

FIG. 2 illustrates the querying system 200 in more detail, according to some embodiments of the invention. Query decompositor 210 receives a question from a user, or application, and decomposes it into one or more sub-questions which have a single question, with the aid of the GAI 150. Query decompositor 210 utilizes dynamic prompt generator 270 to generate a prompt for the GAI 150, for the decomposition. The dynamic prompt generator 270 utilizes the question from the user and attaches metadata information about each of the data sources, and a set of verified simple queries, and creates the prompt for the GAI 150. In one embodiment, the description of the prompt is:

Directions to AI assistant specialized in responding to human questions with syntactically correct queries. The assistant is designed to ignore all prior knowledge and only use the context provided to generate queries that accurately answer the human's intent. The assistant is instructed to use only valid syntax and to adapt entities in the context to the human's question. The assistant is also instructed to return distinct results unless otherwise specified and to return None if the response cannot be constructed using the context.

The context includes hints and examples to explain the meaning of jargon and a database schema that defines valid relationships. The assistant uses the examples and schema to generate queries that retrieve information from the database and return it to the human.

The context retrieval 280 utilizes vector store 180 to identify text chunks in the user question and match them to validated queries in the vector store and their associated data stores. That is, the query gets semantically matched with the existing sample questions and other embedded data in vector store 180 and/or metadata store 190. In one embodiment, the context retrieval 280 includes a first natural language processor model (NLP), which identifies entities in the original question, e.g., performs named-entity recognition (NER). Entities for example may include usernames, host names, groups, device names, etc. The context retrieval 280 in one embodiment, further includes a second natural language processor model (NPL) which uses the identified entities to find which of the filtered metadata of the data sets represented in the metadata store 190 are applicable to user's question. The filtered metadata may include nodes and relationships for a knowledge base, table and index data for a database, or other types of data, as discussed above. In one embodiment, text matching is used. The identified filtered metadata are provided to the dynamic prompt generator, which generates the prompt for the GAI, including the original user question, the identified entities within the question, and sample questions associated with the filtered metadata are identified.

The query decompositor 210 attaches the matching validated queries and the metadata of the data stores to the prompt. This is referred to as the dynamic prompt. This is used by the GAI 150 to generate the actual single subject questions. The GAI 150 returns a set of one or more single subject questions, Q1 through QN, which are passed to the intent inference engine 230. A "single subject question" in this context refers to a question that can be answered based on a single lookup. For example, the question above "what is the host name of Sagar's laptop," the layers include determining who Sagar is, determining what a laptop is, and determining the host name. However, "what is the username of Sagar" is a single subject question because it can be found in a single look-up in a database that relates usernames to personal names.

Once the single subject questions are identified, the intent inference engine 230 is used to determine one or more data sources which should be queried for each of the questions, Q1 through QN. The intent inference engine 230 uses the dynamic prompt generator 270 to generate a dynamic prompt with the single subject question in combination with metadata for the data store(s) from vector store 180. The metadata, for a knowledge base in one embodiment, includes the schema of the data store, and relationships between the nodes of the data store. The metadata for a database may include the index, schema, and tables. In one embodiment, rather than utilizing the filtered metadata directly, the system utilizes a representation of the filtered metadata in the format of a summarization. This is because mixed data formats can cause issues with the accuracy of the responses generated by the GAI 150. Therefore, the metadata representing the filtered metadata of the data set is in a descriptive format, in one embodiment.

In one embodiment, the intent inference engine 230 matches the identified words in the question to the data source metadata, using the GAI 150. In one embodiment, the GAI 150 is prompted to identify the source within the data stores that can be used to answer the questions. Thus, in one embodiment, the inference engine 230 in one embodiment returns not only the data source to query, but also the location within the data source where such data may be found, e.g., for a spreadsheet the specific table, cell, or location.

The selected group of one or more data sources and the respective locations within each data source for each question are passed to the multi-query generator 240. In some embodiments, multiple data sources may be identified that can answer a particular question. In one embodiment, the system does not prioritize data sources, and sends the question to all matching data sources. In another embodiment, the system may have prioritization for the data sources, and may send the question to the highest quality data source, or a subset of identified data sources selected in another way.

The multi-query generator 240 generates queries in the appropriate language and format for the selected data sources. The multi-query generator in one embodiment uses the metadata for the selected data sources from the vector store, in addition to the query, to generate dynamic prompts for GAI 150. The set of data source specific queries are then passed the routing and executor 250.

The routing and executor 250 communicates with data sources 160 and sends the appropriately formatted queries to the identified data sources. The routing and executor 250 in one embodiment can send multiple queries in parallel if they are independent.

If the queries are dependent, the routing and executor 250 sends a first query to the appropriate data source and receives a response. In one embodiment, the routing and executor sends the response back to the multi-query generator 240, to generate an updated version of the next query with data from the response to the first query incorporated into the updated version of the query. The updated query is then sent to the appropriate data source by the routing and executor 250.

As noted above, sometimes there may be multiple responses to a query. In that case, the routing and executor 250 may separately execute the dependent queries for each of the responses. Thus, in one embodiment, there may be multiple bundles of responses, split when the system returns multiple potential responses to a query. In the example above, with the query "what is Sagar's laptop's hostname" the system may have identified two people with the name "Sagar" who have different usernames. In that case, the sequence of questions would be asked for both usernames, and separate response sets would be returned for each of those question sequences.

The responses gathered by routing and executor 250 are sent to output summarizer 260. Output summarizer 260 gathers the responses and utilizes dynamic prompt generator 270 to send the original query, and the collected responses, to the GAI 150, requesting a summary of the responses. As noted above, if there are multiple possible answers, the output summarizer 260 includes all possible answers. In the example above, with the query "what is Sagar's laptop's hostname" the system may have identified two people with the name "Sagar." The summarized answer returned to the user then may be "Sagar Shah's laptop host name is X. Sagar Singh's laptop host name is Y."

Although the GAI 150 is illustrated as a single element, in one embodiment, separate or separately trained GAIs 150 may be used for each of the elements which query the GAI 150. The GAI 150 may be a large language model or may be another type of generative artificial intelligence system. Furthermore, although each of these elements are illustrated as separate logics, in one embodiment, there may be a single complex query sent to the GAI, incorporating the sequence of actions, and these elements may be combined.

Figure 3:
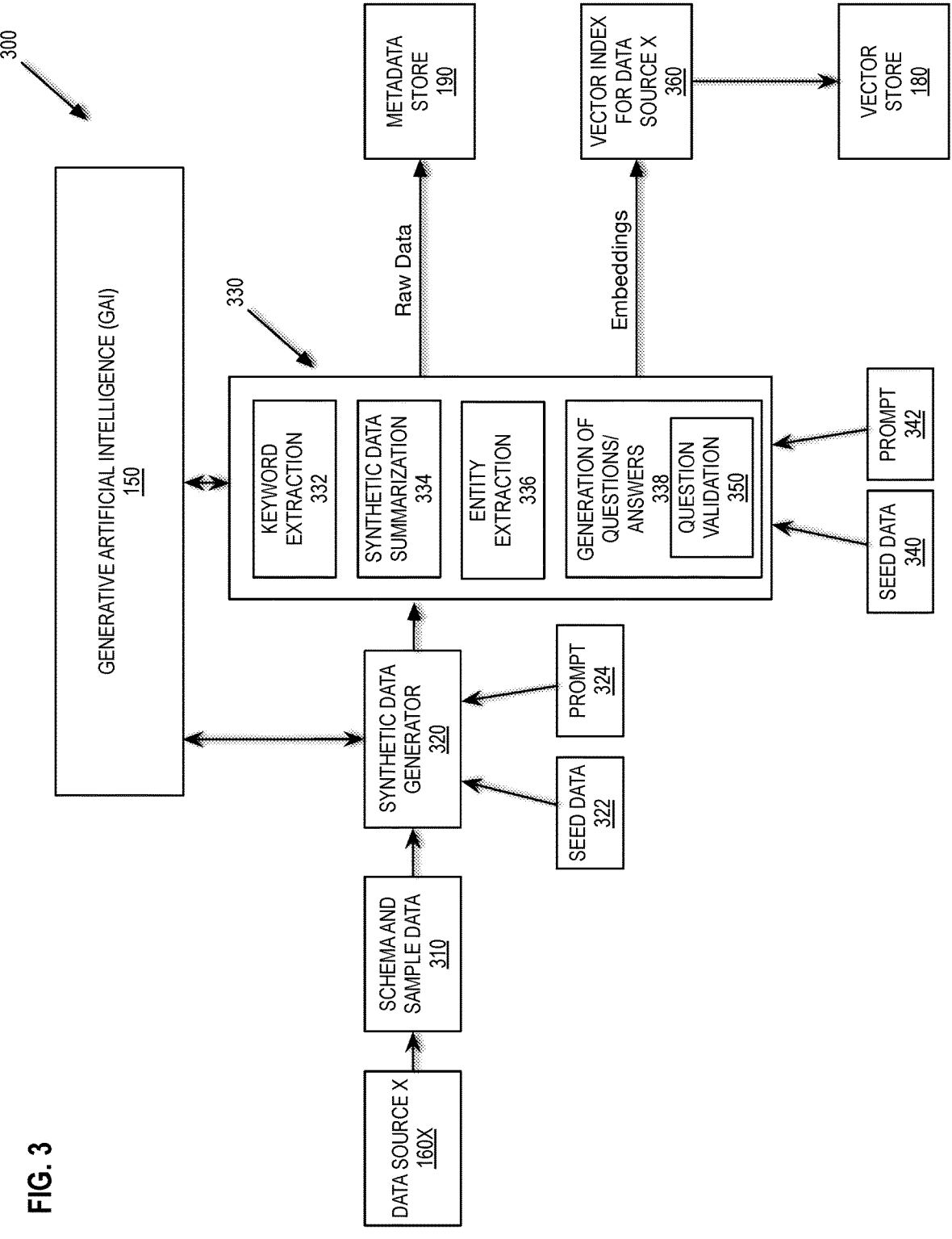
FIG. 3 illustrates the training system, which generates data for the vector store, according to some embodiments of the invention.

FIG. 3 illustrates the training system, which generates data meta information for the vector store and metadata store, according to some embodiments of the invention. As discussed above, the vector store 180 stores embeddings generated by the training system 300, and metadata store 190 stores raw data generated by the training system. In some embodiments, the system may include a single meta information store 170, rather than splitting the embeddings and the raw data. Because the data sources utilized may be several hundred petabytes, the system does not analyze the content of these data sources or use the entirety of the content for selecting a data source. Rather, in one embodiment, the system uses a metadata based analysis of the data sources. The metadata derived by the system is stored in the meta information store 170, which is used by the query generator, as described above.

In one embodiment, the system processes data sources when it is initiated. In one embodiment, as new data sources become available, they are processed and added to the system. In another embodiment, new data sources are periodically processed. In one embodiment, the system may further monitor already processed data sources, to detect alterations to the data source schema that may impact their use. If such an alteration is identified, the data source is reprocessed. The data sources may include raw data sources, such as databases of various formats, as well as processed data sources such as knowledge graphs which consolidate data from multiple information systems into a single data source.

The training system 300 is run for each data source, in one embodiment.

The schema and sample data extractor 310 extracts the schema of the data source 160X. The schema, in one embodiment, may include all of the components and their relationships. In one embodiment, for a knowledge graph the schema and sample data extractor 310 obtains the possible relationships between the nodes, and the available paths. In one embodiment, for a database, the schema and sample data extractor 310 identifies all of the tables and properties. In one embodiment, for a spreadsheet, the schema and sample data extractor 310 identifies all the rows and columns, and sheets. In one embodiment, the schema and sample data extractor 310 also obtains some sample data from the data source. In one embodiment, for a database, it would be a few rows from every table. In one embodiment between two and six rows are selected. In one embodiment, fully populated rows are selected. More or fewer sample rows may be extracted. In another embodiment, the sample rows may not be used. This schema and sample data in one embodiment is stored in metadata store 190.

The synthetic data generator 320 receives seed data 322 of example queries for the data source. In one embodiment, the seed data is manually generated. In another embodiment, the seed data may be collected data of questions previously directed to the data source. In one embodiment a set of 10-30 seed data questions are provided. The synthetic data generator 320 uses the seed data questions 322 along with the schema and sample data of the data source as a prompt 324 for the GAI 150. The GAI 150 is prompted to generate additional questions, to explore the range of data in the data source, as identified by the schema and sample data. In one embodiment, the GAI 150 is prompted to create questions about all possible properties of the data source. This set of questions including the seed data questions 322 and the synthetic questions generated by the GAI 150 is the training set for the data source. The set of all questions is stored in metadata store 190.

The synthetic data generator 320, in one embodiment, also identifies keywords 332, entities 336, and a description of the properties of the data set. In addition, the questions and answers 338 generated, are part of the structured data 330 produced by synthetic data generator 320. In one embodiment, this may be done with the assistance of the GAI 150. In one embodiment, a natural language processor (NLP) generative artificial intelligence is used identifying the keywords and entities.

These elements become part of the meta information for the data source. In one embodiment, the synthetic data generator information is summarized 334 into a short description. That short description indicates what information the data source contains. For example, the description may be Index X has information about device host names, and an example of a device host name is A, B, or C.

In one embodiment, the synthetic questions generated by the GAI 150 are tested by question validation 350. In one embodiment, this is done by running the query against the data source 160X, to ensure that it returns accurate and relevant results. The validated set of questions are part of the metadata associated with the data source.

In one embodiment, the resulting data is referred to as embeddings, and is processed by vector index 360 to create metadata stored in the vector store 180 and/or metadata store 190. In one embodiment, there are multiple indexes for each data store. Thus, the resulting meta information includes metadata representing the schema and content of each data source, as well as a large set of validated sample questions. In one embodiment, rather than storing the schema and sample data directly, the vector index 360 summarizes the schema, and uses that summary as metadata. This is because, in some embodiments, mixed data types confuse the GAI. Therefore, instead of having metadata schema, questions, and descriptive prompt instructions, the system provides all data in a consistent format. In one embodiment, that format is descriptive, e.g., a paragraph of description. As discussed above, when prompts are sent to the GAI, this metadata is used as embeddings, to create the dynamic prompts.

Figure 4:
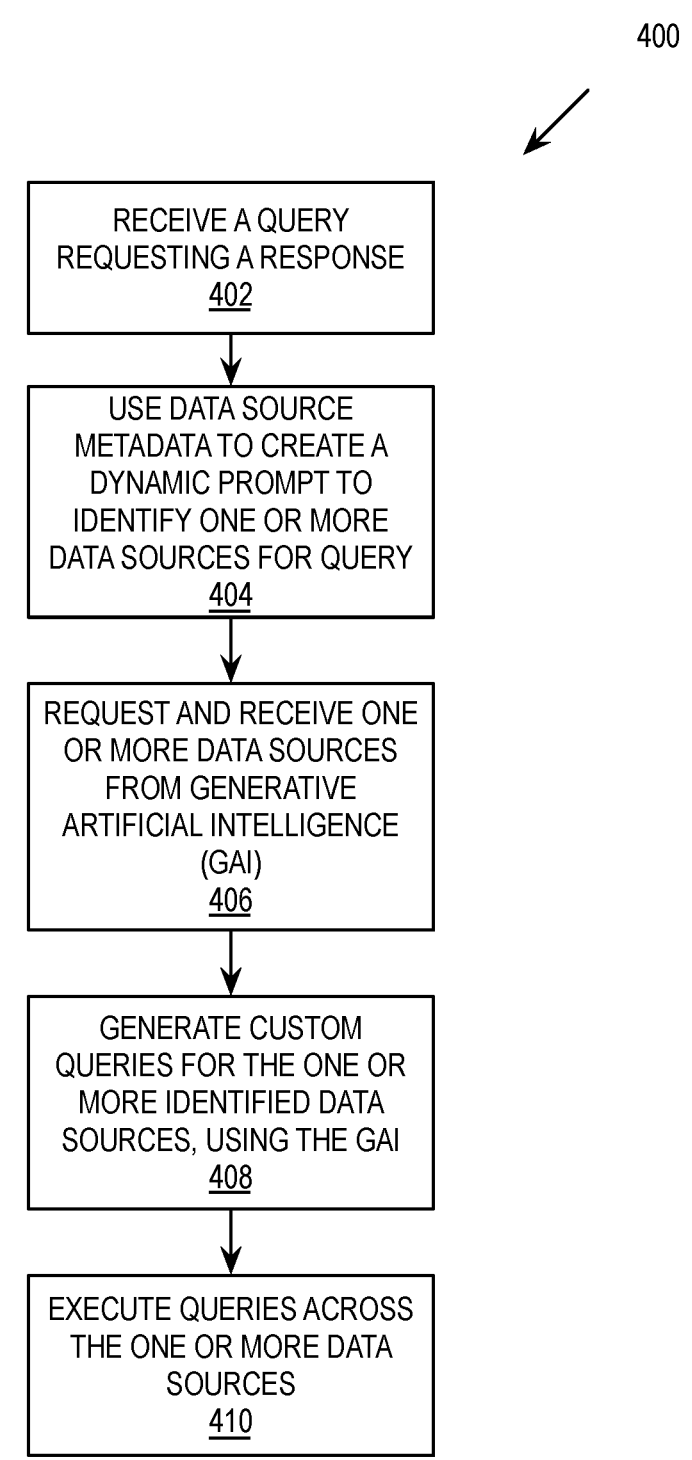
FIG. 4 is a flow diagram of an example method to generate responses across a plurality of data sources, in accordance with some embodiments of the present disclosure.

FIG. 4 is a flow diagram of an example method to generate responses across a plurality of data sources, in accordance with some embodiments of the present disclosure. The process 400 starts when a query requesting a response is received, at operation 402. In one embodiment, this query is the single subject question generated by the GAI, as described above.

At operation 404, the metadata associated with the data sources is matched to the query. The filtered metadata represents the schema, and characteristics of data within the data source. In one embodiment, the metadata is retrieved from a vector store. The process then creates a prompt incorporating the query and the data source metadata. This prompt is referred to as a dynamic prompt, including the query, the metadata associated with the data sources that were matched, and instructions.

At operation 406, the system sends the dynamic prompt to the GAI, and receives a list of one or more data sources, which are the selected targets for the query. In one embodiment, the GAI is prompted to return all data sources that according to its analysis, based on the query and the metadata, have relevant information. The GAI may return multiple data sources. In that case, a single query may be sent to multiple data sources. As discussed above, the query here is a single subject query. However, even such a single subject query may have multiple data sources that are responsive. For example, for determining the username of a user on the system, the system may have access to various identity access management data sources. The GAI in one embodiment, would return all of the relevant data sources. In another embodiment only the one, two, or another number of most relevant data sources are returned. In one embodiment, relevance is determined by the match between the context provided in the query and the potential responses.

At operation 408, custom queries are generated for each of the identified data sources. The custom queries are generated using the GAI, in the appropriate language and format for each identified data source. The prompt for the custom query sent to the GAI includes the query and a description of the schema of the identified data source.

At operation 410, the queries are executed across the one or more data sources. Executing a query includes sending the custom query to the data source and receiving a response.

In this way, the present system enables the use of a generative artificial intelligence to respond to a natural language query or a query in another format, without requiring the GAI to be trained with all of the data in the various data sources. Rather, the system uses the extracted metadata to identify the data source to be queried, and format the query, providing the benefits of the GAI without requiring the GAI to contain all of the data from the various data sources. It also allows the addition of new data sources without requiring retraining of the GAI.

FIG. 5 is a detailed flow diagram of an example method to generate responses across a plurality of data sources, in accordance with some embodiments of the present disclosure. The process 500 starts when a question requesting a response is received, at operation 502. In one embodiment, the question may be received from a user. In one embodiment, the system may provide a user interface for a query. In some embodiments, the system may provide different user interfaces for executing different queries from different data sources.

At operation 504, a decomposition request is sent to a GAI. The decomposition request is a dynamic prompt that includes the original question and metadata, representing previously validated queries. The GAI returns one or more single subject questions. In one embodiment, the GAI prompt instructs the GAI to select a question which matches one of the previously validated queries, rather than making up a new question.

At operation 506, the process, for each single subject question, identifies the data source(s) that should be used for responding to that question. In one embodiment, the data source is identified by the GAI. In one embodiment, a dynamic prompt, including metadata about the data sources, and the single subject question, is sent to the GAI. The GAI returns one or more data sources which are identified as having the answer for each single subject question.

At operation 508, the process generates custom queries for each data source. In one embodiment, the dynamic prompt to generate the custom query sent to the LLM includes the metadata for the selected data source, which provides the language and format of the data source to the GAI. The GAI returns a custom query in the appropriate language and format to obtain the relevant response to the query from the data source.

At operation 510, the queries are sequenced. Some queries may be dependent on other queries, while others are independent. In one embodiment, the single subject questions, which do not require chaining may be sent in parallel to the data sources for increased efficiency and response speed.

At operation 512, the custom query is routed to the data source, and a response is received.

At operation 514, the process determines whether there are dependent queries that utilize the response from the custom query for which response data has been collected. If so, the dependent query is modified with the response data, at operation 516. The process then returns to block 512, to route the modified query to the appropriate data source and collect its response data. In one embodiment, the updating of the dependent query may utilize the GAI. In one embodiment, the original query and the response are both sent to the GAI, along with the relevant information about the selected data source, to create the modified query that includes the information derived from previous questions.

If there are no dependent queries, as determined at operation 514, the process continues to operation 518. At operation 518, the process determines whether there are more queries that have not yet been asked. If there are more queries, the process returns to block 512, to route the next query to the appropriate data source.

Once all queries have been processed, at operation 520 the output is summarized and provided to the user. In one embodiment, the summarization utilizes the GAI. For the summarization, the results of all of the queries, as well as the original query from the user, are provided to the GAI, in one embodiment. The summarized output in one embodiment is provided to the requesting user or system. The system does not weigh contradictory answers, in one embodiment, but rather presents all responses.

Figure 6:
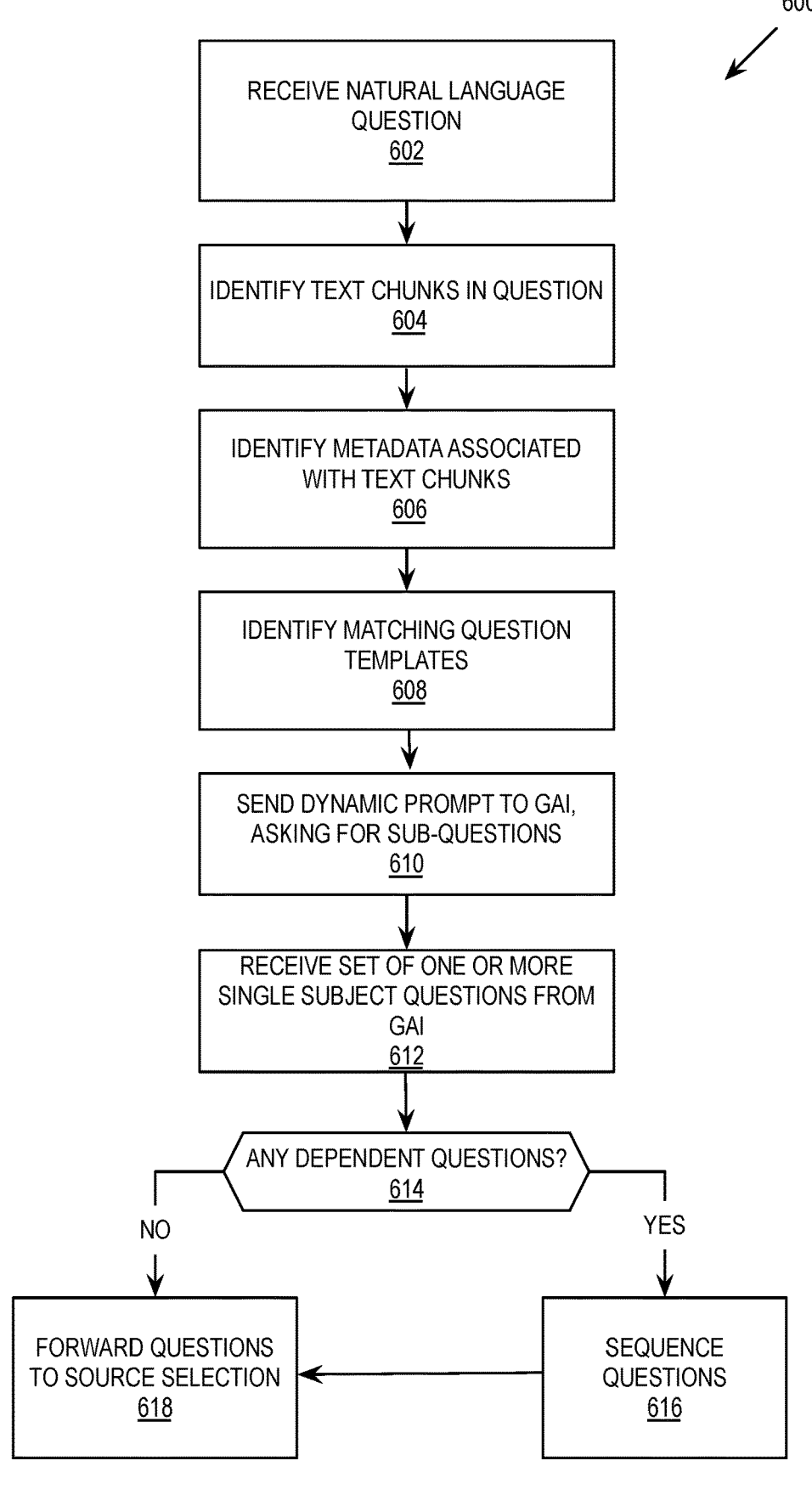
FIG. 6 is a flow diagram of generating individual questions from a natural language query, in accordance with some embodiments of the present disclosure.

FIG. 6 is a flow diagram illustrating the process 600 of generating individual single subject questions from a natural language question, in accordance with some embodiments of the present disclosure. The initial natural language question is received at operation 602.

At operation 604, text chunks are identified in the questions. The text chunks are units of text that represent different types of data. In the original query example of "what is the hostname of Sagar's laptop" the text chunks are "hostname," "Sagar," and "laptop" in one embodiment. In one embodiment, a first NLP model is used to identify the text chunks representing entities. In one embodiment, the NLP model is a text matching model.

At operation 606, metadata associated with the text chunks is identified and added to the prompt, generating a dynamic query. The identification of metadata in one embodiment utilizes a text classification NLP model, to match the text chunks to the metadata for the data sets. In one embodiment, text chunks that correspond to known metadata derived from data sources is identified. For example, "username" is a known concept, and would be present in one or more data sources. Descriptors such as "Sagar" would be identified as names and matched with "name" labeled metadata.

At operation 608, matching question templates are identified. As discussed above, when the system is initially set up there is question generation. Question generation automatically generates questions based on some seed questions and the structure of each data source. These generated questions are validated for each data source. Thus, for most queries that can be answered by data from the data sources, there would be one or more question templates that parallel the question. These question templates are also considered metadata.

At operation 610, the dynamic prompt including the matching question templates, identified and categorized text chunks, and the original query are sent to the GAI, with a prompt to generate single subject questions. At operation 612, a set of one or more single subject questions are received from the GAI.

At operation 614, the process determines whether there are any dependent questions. If so, at operation 616, the questions are sequenced to ensure that any question that needs a prior answer is asked only after all of its parent questions are asked. Then, at operation 618, the sequenced questions are forwarded to source selection. If there are no dependent questions, the process forwards the single subject questions to source selection directly, at operation 618.

FIG. 7 is a flow diagram of pre-processing a data source, in accordance with some embodiments of the present disclosure. The process 700 is used, in one embodiment, to preprocess each data source. This exemplary flow diagram is for a knowledge graph in which there are nodes with relationships. However, one of skill in the art would understand the similar processing that would be used for a database, spreadsheet, file, or other data source storage structure.

At operation 702, the schema and metadata are extracted from the data source. The schema is the structure or organization of data. Metadata includes descriptive metadata such as the name, location, and language, of the data source. Metadata also includes structural metadata such as the relationships within the data source.

At operation 704, the process determines the relationship for the nodes, in a knowledge graph, or relationships between entities. In one embodiment, for a knowledge graph, the extraction identifies the nodes, and the possible relationships between the nodes. In one embodiment, the extraction also defines the entire paths between nodes. For a database, in one embodiment, the extraction would identify the tables and the properties. In one embodiment, the extraction also obtains sample data from the various combinations.

At block 706, in one embodiment a descriptive paragraph is generated from the schema, metadata, and relationship information generated. In one embodiment, the metadata included in a dynamic prompt is included as descriptive data, to avoid a prompt with mixed data formats. Therefore, descriptive data is created from the extracted information, in one embodiment.

At operation 708, initial seed single subject questions are provided. The initial seed questions are exemplary questions that may be answered using the data source. In one embodiment, the questions are manually generated for this process. In one embodiment, these questions are automatically generated based on questions that were previously answered using this data source. In one embodiment, the seed questions may be a curated set of questions based on collected queries directed to the data set.

At operation 710, the GAI is used to generate a large question pool. The GAI may be provided the original seed questions, as well as the schema, metadata, and sample data for the data source.

At operation 712, the large question pool is validated by running each of the queries in the large question pool against the data source, and determining whether answers are obtained.

This data, including the schema, metadata, sample data, and large pool of questions for the data source are stored as part of the meta information for the data set in the meta information store at operation 714.

In one embodiment, the process 700 further generates a human readable description for the content of the data source, which is also added to the meta information store.

FIG. 8 is a flow diagram of training the NPL systems, in accordance with some embodiments of the present disclosure. As discussed above, in one embodiment, an NLP is used to provide identification of text chunks, e.g., entities in the question, and identification of filtered metadata corresponding to the identified text chunks. In one embodiment, separate NLP systems are used for the two portions of the pre-processing, prior to sending data to the GAI. Both portions, in one embodiment, utilize the validated pool of questions and answers, which were generated by the GAI, as discussed above.

The process 800 receives the validated question and answer pool, at operation 802. As discussed above, the question & answer pool includes seed questions and synthetically generated questions, which are validated against the data set they are associated with.

At operation 804, for the text classifier, the validated questions are labeled with the filtered metadata from the data sets. The filtered metadata may include nodes, tables/columns, or other information indicate the locations at which data is found within the data store.

At operation 806, the text classification NPL model is trained with a first portion of the labeled question pool. The training teaches the NPL to associate questions with specific locations in the data set.

At operation 808, the text classification NPL's training is validated with the second portion of the labeled question pool. Once trained, and validated, the text classification NPL is used, as described above, to match the text chunks in a query to the metadata of the data sets.

In parallel, or separately, the named entity recognition NPL is trained. At operation 814, the validated questions are labeled with sample entities. The sample entities, in one embodiment, may correspond to the row/column headers, in a spreadsheet, for example.

At operation 816, the named entity recognition (NER) NLP model is trained using a first portion of the sample entity labeling set. And at operation 818, the NER model is validated with the second portion of the labeled question pool.

In one embodiment, when two NLP models are trained and validated, they are made available to the querying system, at operation 820. The querying system utilizes the NLPs, as described above, to provide context for generating the prompts for the GAI.

Figure 9:
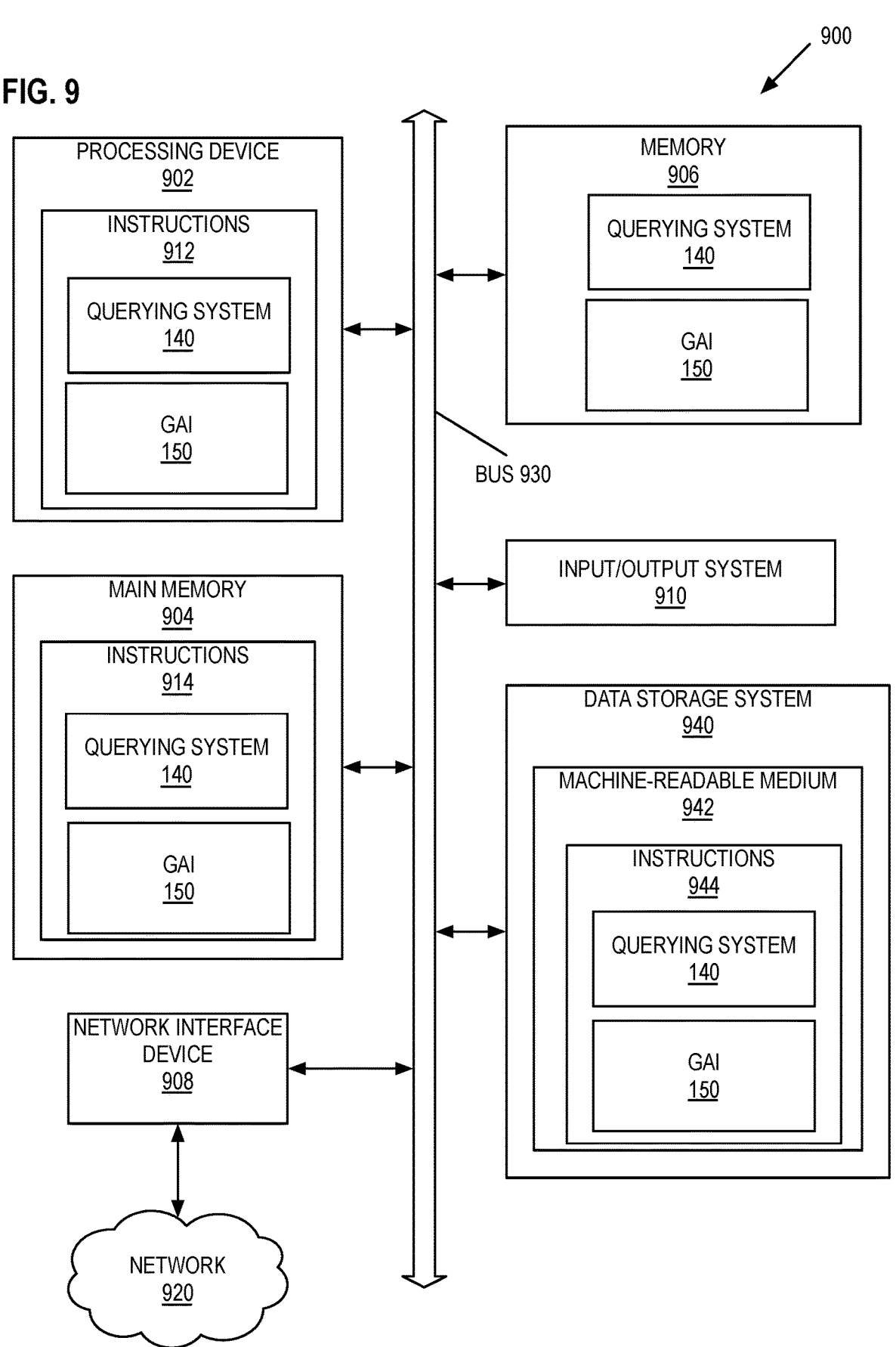
FIG. 9 is a block diagram of an example computer system in which embodiments of the present disclosure can operate.

FIG. 9 is a block diagram of an example computer system 900 within which a set of instructions, for causing the machine to perform any one or more of the methodologies discussed herein, can be executed. In some embodiments, the computer system 900 can correspond to a component of a networked computer system (e.g., the computer system 100 of FIG. 1) that includes, is coupled to, or utilizes a machine to execute an operating system to perform operations corresponding to the querying system 140 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a memory 906 (e.g., flash memory, static random access memory (SRAM), etc.), an input/output system 910, and a data storage system 940, which communicate with each other via a bus 930.

Processing device 902 represents one or more general-purpose processing devices such as a microprocessor, a central processing unit, graphical processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 may also include a mixture of general-purpose and special-purpose processing devices. The processing device 902 is configured to execute instructions 912 for performing the operations and steps discussed herein.

The computer system 900 can further include a network interface device 908 to communicate over the network 920. Network interface device 908 can provide a two-way data communication coupling to a network. For example, network interface device 908 can be an integrated-services digital network (ISDN) card, cable modem, satellite modem, or a modem to provide a data communication connection to a corresponding type of telephone line. As another example, network interface device 908 can be a local area network (LAN) card to provide a data communication connection to a compatible LAN. Wireless links can also be implemented. In any such implementation network interface device 908 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system 900.

Computer system 900 can send messages and receive data, including program code, through the network(s) and network interface device 908. In the Internet example, a server can transmit a requested code for an application program through network 920 and network interface device 908. The received code can be executed by processing device 902 as it is received, and/or stored in data storage system 940, or other non-volatile storage for later execution.

The input/output system 910 can include an output device, such as a display, for example a liquid crystal display (LCD) or a touchscreen display, for displaying information to a computer user, or a speaker, a haptic device, or another form of output device. The input/output system 910 can include an input device, for example, alphanumeric keys and other keys configured for communicating information and command selections to processing device 902. An input device can, alternatively or in addition, include a cursor control, such as a mouse, a trackball, or cursor direction keys for communicating direction information and command selections to processing device 902 and for controlling cursor movement on a display. An input device can, alternatively or in addition, include a microphone, a sensor, or an array of sensors, for communicating sensed information to processing device 902. Sensed information can include voice commands, audio signals, geographic location information, and/or digital imagery, for example.

The data storage system 940 can include a machine-readable storage medium 942 (also known as a computer-readable medium) on which is stored one or more sets of instructions 944 or software embodying any one or more of the methodologies or functions described herein. The instructions 912, 914, 944 can also reside, completely or at least partially, within the main memory 904 and/or within the processing device 902 during execution thereof by the computer system 900, the main memory 904 and the processing device 902 also constituting machine-readable storage media.

In one embodiment, the instructions 912, 914, 944 include instructions to implement functionality corresponding to querying system 140 (e.g., the querying system 140 of FIG. 1) and/or GAI 150 (e.g., the GAI 150 of FIG. 1). While the machine-readable storage medium 942 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method of generating data validation assertions and verifying that data batches meet these data validation assertions, in response to its processor executing a computer program (e.g., a sequence of instructions) contained in a memory or other non-transitory computer readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

While embodiments of the invention have been described in relation to using a generative artificial intelligence (GAI) such as a large language model, other generative artificial intelligence systems may be used. Therefore, embodiments of the invention are not limited to a large language model. In addition, while embodiments of the invention have been described in relation to user questions, alternative embodiments could be implemented such that questions are received from automated systems.

Additionally, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
training a generative artificial intelligence (GAI) model based on pre-processing data sources, wherein the pre-processing of each of the data sources comprises:
generating a supplemental dataset for a data source described by a first metadata, the generating comprising:
extracting a schema of the data source;
extracting representative sample data from the data source;
prompting the GAI model to generate synthetic queries for the data source based on the schema and the representative sample data to query across the data source, wherein the schema, the representative sample data, and the synthetic queries comprise the supplemental dataset;
running each of the synthetic queries generated by the GAI model against the data source to validate the synthetic queries; and
storing the validated synthetic queries as part of the supplemental dataset;
storing the supplemental dataset in a vector store, wherein the supplemental dataset supplements the first metadata to describe the data source;

generating embeddings of the first metadata and the supplemental dataset; receiving a query;

prompting the GAI model to select a matching data source for responding to the query, by sending the query and the embeddings of the first metadata and the supplemental data sent to the GAI model and prompting the GAI model to select the matching data source;

prompting the GAI model to generate a custom query targeted to the matching data source selected by the GAI model by sending the embeddings and a subset of the synthetic queries;

executing the custom query at the matching data source;

summarizing results from executing the custom query; and providing a response to the query based on the results.

2. The method of claim 1, further comprising filtering the supplemental dataset, wherein the filtering comprises:

identifying one or more text chunks in the query;

matching each text chunk to the metadata and the supplemental data representing data types and relationships in the data sources;

customizing the custom query by embedding the matched metadata associated with the text chunks to the query to generate a dynamic query.

3. The method of claim 1, further comprising:

generating single subject questions from the query, using the GAI model.

4. The method of claim 3, further comprising:

identifying any dependency between the single subject questions returned by the GAI model; and sequencing the single subject questions based on the identified dependency.

5. The method of claim 3, further comprising:

after receiving a first response to a first custom query from a first data source, utilizing the first response to update a second custom query, prior to sending the second query to a data source.

6. The method of claim 1, wherein the selecting the data source comprises:

matching a query to the synthetic queries associated with each of the data sources.

7. The method of claim 6, wherein the pre-processing further extracts data relationships in the data source.

8. The method of claim 7, wherein the schema, the data relationships, and the sample data extracted from the data source is formatted into a descriptive text and stored in the vector store.

9. The method of claim 1, wherein generating a custom query comprises:

identifying a language associated with the data source;

identifying a data format for the data source;

translating the query into the language and data format of the data source; and attaching metadata associated with the data source.

10. The method of claim 1, wherein the query is a natural language query.

11. A system comprising:

at least one processor;

at least one memory coupled to the at least one processor, wherein the at least one memory comprises instructions that, when executed by the at least one processor, cause the at least one processor to perform at least one operation comprising:

training a generative artificial intelligence (GAI) model based on pre-processing data sources, wherein the pre-processing of each of the data sources comprises:

generating a supplemental dataset for a data source described by a first metadata, the generating comprising:

extracting a schema of the data source;

extracting representative sample data from the data source;

prompting the GAI model to generate synthetic queries for the data source based on the schema and the representative sample data to query across the data source wherein the schema, the representative sample data, and the synthetic queries comprise the supplemental dataset;

running each of the synthetic queries generated by the GAI model against the data source to validate the synthetic queries; and storing the validated synthetic queries as part of the supplemental dataset;

storing the supplemental dataset in a vector store, wherein the supplemental dataset supplements the first metadata to describe the data source;

generating embeddings of the first metadata and the supplemental dataset; receiving a query;

prompting the GAI model to select a matching data source for answering the query, by sending the query and the embeddings of the first metadata and the supplemental data to the GAI model and prompting the GAI model to select the matching data source;

prompting the GAI to generate a custom query targeted to the matching data source selected by the GAI model by sending the embeddings and a subset of the synthetic queries, the custom query formatted to be sent to the matching data source;

executing the custom query at the matching data source; and summarizing results from the executing and providing a response to the query.

12. The system of claim 11, further comprising:

identifying one or more text chunks in the query;

matching each text chunk to the metadata and the supplemental data representing data types and relationships in the data sources;

customizing the query by embedding the matched metadata and supplemental data associated with the text chunks to the query to generate a dynamic query.

13. The system of claim 11, further comprising:

generating single subject questions from the query, using the GAI model.

14. The system of claim 13, further comprising:

identifying any dependency between the single subject questions returned by the GAI model;

sequencing the single subject questions based on the identified dependency; and after receiving a first response to a first custom query from a first data source, utilizing the first response to update a second custom query, prior to sending the second query to a data source.

15. The system of claim 11, wherein identifying the data sources comprises, for each question:

matching the question to the synthetic queries associated with each of the the data sources.

16. The system of claim 15, wherein the pre-processing extracts data relationships in the data source.

17. The system of claim 16, wherein the schema, the data relationships, and the sample data is formatted into a descriptive text and stored in a vector store as the metadata for the data source.

18. The system of claim 11, wherein generating a custom query comprises:

identifying a language associated with the data source;

identifying a data format for the data source;

translating the query into the language and data format of the data source; and attaching metadata associated with the data source.

19. A non-transitory computer readable medium containing program instructions for causing a computer to perform a method comprising:

training a generative artificial intelligence (GAI) model based on pre-processing heterogeneous data sources, wherein the pre-processing of each of the data sources comprises:

generating a supplemental dataset for a data source described by a first metadata, the generating comprising:

extracting a schema of the data source;

extracting representative sample data from the data source;

prompting the GAI model to generate synthetic queries for the data source based on the schema and the representative sample data to query across the data source, the representative sample data, and the synthetic queries comprise the supplemental dataset;

running each of the synthetic queries generated by the GAI model against the data source to validate the synthetic queries; and storing the validated synthetic queries as part of the supplemental dataset;

storing the supplemental dataset in a vector store, wherein the supplemental dataset supplements the first metadata to describe the data source;

generating embeddings of the first metadata and the supplemental dataset; receiving a query;

prompting the GAI to select a matching data source from the heterogeneous data sources for answering the query, by sending the query and the embeddings of the first metadata and the supplemental data to the GAI model and prompting the GAI model to select the matching data source;

prompting the GAI to generate a custom query targeted to the matching data source selected by the GAI model by sending the GAI model the embeddings and a subset of the synthetic queries, the custom query formatted to be sent to the selected data sources;

executing the custom query at the matching data source;

summarizing results from the executing; and providing a response to the query.

\* \* \* \* \*